Patented June 22, 1937

2,084,687

UNITED STATES PATENT OFFICE 2,084,687

COMPOSITION FOR USE IN HYDROGENATING AND METHOD OF PREPARING AND UTILIZING SAME

Holger B. Jespersen, Mountain Lakes, N. J., assignor to Hanson-Van Winkle-Munning Company, Matawan, N. J., a corporation of New Jersey No Drawing. Application January 21, 1935, Serial No. 2,755

3 Claims. (Cl. 87—12)

This invention relates quite generally to the hydrogenation and similar operations upon animal and vegetable oils and fats in which catalysts such as finely divided nickel are employed.

In the production of finely divided nickel, it has heretofore been proposed to employ nickel formate crystals which are ground to a fine powder and thereafter subjected to decomposition by reducing agents and heat or by heat alone. It has been proposed to mix the finely divided nickel formate with an oil vehicle, and to effect the reduction of the formate to metallic nickel in such oil vehicle for the purpose of protecting it from oxidation. A concentrated mixture of catalyst and oil is thus obtained and may be introduced into the oil which is to be hydrogenated in accordance with well-known procedure by passing hydrogen into the heated body of oil containing such catalyst.

An object of the present invention is to provide certain improvements on previously known methods such as above outlined, and others related thereto, with a view more particularly to obtaining the catalyst in a much finer state of subdivision, whereby its catalytic efficiency is substantially increased. A further object of the invention is to provide a stable composition which may be shipped over long distances and stored for relatively long periods of time without deterioration, and which contains a compound of the metal which is to serve as catalyst in an extremely finely divided form and is reducible to metallic state within the body of the oil being hydrogenated, under the influence of the temperature at which the hydrogenation is conducted, without developing substances or reduction products detrimental to the hydrogenating operation.

The invention is applicable to the production of nickel catalysts, to be used alone or with other catalytic material for hydrogenation, from nickel compounds which are easily reducible by heat at the temperature of hydrogenation, and which are in the form of crystals containing water of crystallization. Examples of such nickel compounds are the formate, acetate, oxalate and borate. Since the formate is in most respects the most suitable, and perhaps the most familiar of these in the hydrogenation industry, reference is made more particularly to the nickel formate for the purposes of illustrating the invention. When a nickel compound containing water of crystallization is reduced by heat in the hydrogenation process, the water of crystallization is driven off, and under the conditions existing it tends to decompose glycerides into free fatty acid and glycerine, which latter will adhere to the nickel and hence be detrimental to its catalytic action in promoting the hydrogenation. For this reason, the water of crystallization in such easily reducible nickel compounds is highly objectionable. A further objection to the water of crystallization in the preparation of a catalyst is that it imposes serious limitations upon the degree of fineness to which the compound can be ground. I have discovered that the production of the catalyst and the effectiveness of the catalyst are very much improved by the preliminary removal of the water of crystallization from the commercial formate or other reducible compound of nickel in question, since by removing this water of crystallization prior to grinding, I am able to produce a very much finer subdivision of the nickel compound, thus enabling the production of a much finer state of subdivision of the nickel when the compound is reduced in oil, and at the same time avoiding the introduction of water into the oil, which would tend to decompose the glycerides and thus interfere with the presentation of the nickel surface to the oil and hydrogen.

In carrying out the invention, the reducible nickel compound, preferably nickel formate, containing water of crystallization, is subjected to an elevated temperature below its decomposition temperature, in an oil vehicle, until the water of crystallization has been driven off. In the case of nickel formate, this may take place at about 115° C. at atmospheric pressure, or at corresponding lower temperatures at reduced pressures. If desired, the dehydration can take place in air, prior to the admixture of the formate with oil, or partly in air and partly after admixture with the oil. It is, however, in either case advisable to subject the formate to a preliminary grinding operation before introduction of the same into the oil. The oil employed may be a quantity of the same oil as that which is to be hydrogenated, or some of the same oil after hydrogenation. The portions of oil and formate are, of course, variable according to the particular oil employed, and also in accordance with the consistency desired in the finished composition, which may be in the form of a liquid, semi-liquid, a paste or a solid cake. A typical example would be represented by a mixture of equal parts by weight of hydrogenated cottonseed oil and commercial nickel formate. The nickel compound should in any case represent at least about 5% of the total by weight, and it may represent as much as about 75% or 80% by weight.

After the admixture of the nickel formate with oil, and after the dehydration of the formate, the oil-dehydrated nickel formate mixture is then subjected to an intensive grinding or other mechanical reduction, as by repeatedly passing it through a roller mill, until the particles of the nickel formate have approached the state of a semi-colloidal suspension in the oil. This may be done while maintaining the oil at an elevated temperature, below the decomposition temperature of the formate, and by thus maintaining the oil-formate mixture in a fluid or semi-fluid state, the oil containing the coarser particles may be intermittently or continuously removed, as by settling or the like, and returned to the roller mill, whereas that portion of the oil containing the finer particles, which remain longer suspended, may be discharged into containers where it is cooled and packed in suitable form for storage or shipment. A particularly favorable and convenient form for the final product thus obtained is in the form of a solidified molded cake or bar of such a size as to contain a standard unit quantity of nickel formate so that the composition will represent the quantity required for the hydrogenation of a given volume of oil. In this way the purchaser or user may introduce into his known quantity of oil to be hydrogenated a definite number of cakes or bars of the composition. In the hydrogenation process, the quantity of metallic nickel catalyst is usually about .2 to .25% of that of the oil.

Since the hydrogenation of oil is an exothermic chemical action, and is usually performed in closed tanks, the introduction of the dehydrated nickel formate or other easily reducible compound of nickel will not give rise to the generation of steam, which would develop objectionable pressure within the system. The temperature of hydrogenation, which is commonly from 150 to 200° C., is sufficient to decompose the nickel formate to metallic nickel, and as this metallic nickel will be in extremely divided form, on account of the very fine subdivision of the nickel formate, the catalyst is easily distributed and remains suspended throughout the oil body under agitation.

While reference has been made more particularly to oils, it is to be understood that oils, fats and similar animal and vegetable or other materials capable of hydrogenation are meant where reference is made to oils. Furthermore, as previously stated, the invention in its broader aspects is not limited to the use of nickel formate but includes other easily reducible nickel compounds which contain water of crystallization, of which several examples have already been given. It should also be pointed out that the nickel compound in the concentrated composition may be heated for the reduction to metallic nickel prior to the introduction of the composition into the oil to be hydrogenated. In such case, however, the reduced composition should be introduced promptly into the oil to be hydrogenated, as the keeping qualities of the reduced composition are not so good as in the case of the unreduced composition.

I claim:

1. A composition for use in hydrogenating oils, comprising a mixture of oil and finely divided dehydrated nickel formate.

2. A composition for use in hydrogenating oil, which comprises a mixture of oil and finely divided anhydrous nickel formate, in which the nickel formate represents at least 5% of the total by weight.

3. The method of preparing materials for use in hydrogenating oil, which comprises mixing with oil a hydrated crystal of a nickel salt easily reducible by heat, dehydrating such nickel salt without reducing same, and thereafter grinding the mixture of the oil and dehydrated nickel salt.

HOLGER B. JESPERSEN.